UNITED STATES PATENT OFFICE.

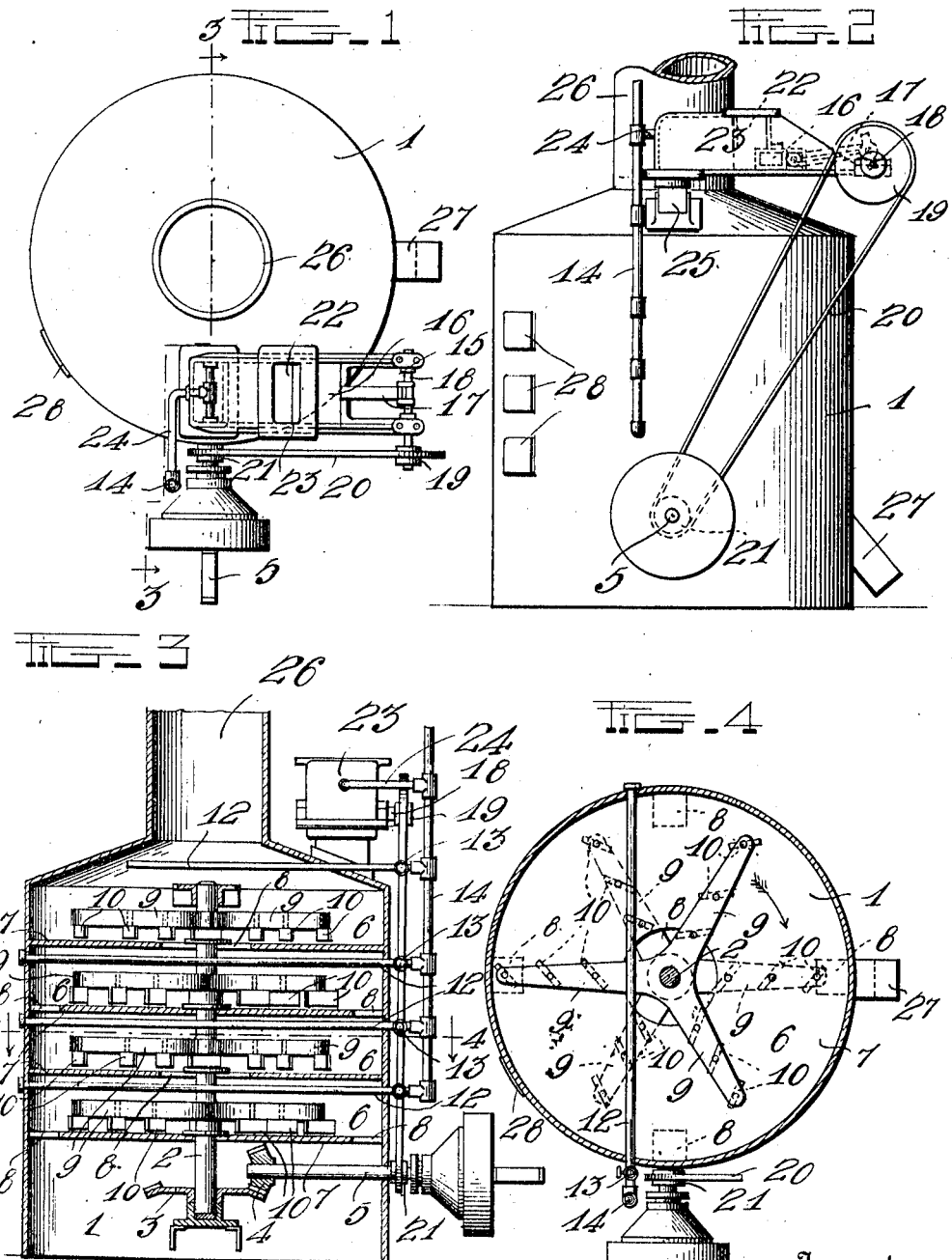

JAMES CURRIE, OF ALLENTOWN, PENNSYLVANIA.

MACHINE FOR HYDRATING LIME.

989,126.  Specification of Letters Patent.  Patented Apr. 11, 1911.

Application filed June 8, 1910. Serial No. 565,861.

*To all whom it may concern:*

Be it known that I, JAMES CURRIE, a subject of the King of Great Britain, and a resident of Allentown, in the county of Lehigh, in the State of Pennsylvania, have invented certain new and useful Improvements in Machines for Hydrating Lime, of which the following is a specification.

This invention relates to improvements in lime hydrating machines, and the object thereof is to provide simply constructed and efficient means for effectively hydrating the lime and discharging it into a suitable receptacle.

With this and other objects in view, the invention consists of certain novel features of construction, combination and arrangement of parts as will be more fully described and particularly pointed out in the appended claims.

In the accompanying drawing: Figure 1 is a top plan view of this improved apparatus; Fig. 2 is a side elevation thereof; Fig. 3 is a longitudinal vertical section taken on the line 3—3 of Fig. 1; Fig. 4 is a horizontal section taken on the line 4—4 of Fig. 3.

In the embodiment illustrated, a cylindrical casing 1 is shown, in which is mounted a vertically disposed revolving shaft 2, the opposite ends of which are arranged in suitable bearings. The bevel gear 3 is fixed to one end, preferably the lower end thereof, and meshes with a similar gear 4 carried by a driving shaft 5, to which power is imparted by any suitable means. This cylinder 1 is divided into a plurality of horizontally arranged compartments as 6, any desired number of which may be employed. These compartments are preferably formed by means of horizontally disposed shelves or partitions 7, in which suitable openings 8 are provided. These openings are preferably arranged near the center in one partition and near the periphery in the next, alternating in this respect throughout the various compartments, as is shown clearly in Fig. 3.

Fixed to the shaft 2, in each compartment, are a plurality of radially extending arms 9 having a plurality of plows or scrapers 10 depending from their lower faces. These plows or scrapers 10 are preferably pivotally mounted in the arms 9 and are provided with any suitable means for holding them in adjusted position. The length of time the material being treated remains in any one of the compartments 6 may be regulated by adjusting the angle of the scrapers 10, as well as by the speed of the vertical shaft 2.

Water is admitted to each of the compartments 6 through any convenient number of pipes as 12, which are arranged in the upper ends of the compartments and are individually controlled by suitable valves 13. These pipes 12 are preferably perforated to discharge the water in the form of spray onto the lime being treated. These pipes 12 are connected outside the casing 1 with a suitable supply pipe 14, which may be connected with a main or any other suitable source.

The lime to be treated is fed into the casing 1 by means of an adjustable feeder 15 preferably constructed as shown in Figs. 1 and 3, in which the feeder consists of a reciprocating block 16 connected by a pitman 17 with a shaft 18 on which is mounted a pulley 19, over which a belt 20 passes to a pulley 21 fixed on the drive shaft 5, by means of which motion is imparted to the feeder. The lime is fed into said feeder 15 through an opening 22, from a hopper 23. The amount of lime fed may be regulated by varying the stroke or length of travel of the block 16, which may be accomplished in any suitable or desired manner. A branch pipe 24 leads from the pipe 14 and discharges into said feeder, preferably at a point above the pipe 25, which conveys the lime from the feeder to the uppermost chamber or compartment in the casing 1. A suitable stack or chimney 26 is arranged at the upper end of the casing 1 for carrying off the hot air and vapor generated in the casing by the action of the water on the lime during the hydrating process.

In the operation of this improved apparatus, the lime from the feeder 15 falls onto the uppermost shelf 7, and water from the pipe 12, arranged in the compartment of which said shelf forms the bottom, is sprayed onto the lime, causing the disintegration thereof. The rotation of the shaft 2 causes the scrapers 10 to revolve therewith, and the material in the compartment at the upper end of the casing is carried around by the plows or scrapers 10 therein, which latter may be set at any suitable or desired angle. These scrapers cause the lime to move toward the opening 8 arranged at the center of the compartment adjacent to the shaft 2, and through which the lime falls into the next compartment below, and is there engaged by the scrapers in this compartment, which are preferably set at an opposite angle to those in the compartment above it. These scrapers cause the material to move outward until it reaches the opening at the periphery of the casing, through which it drops into the compartment below, and this operation continues through the various compartments until the lime in a completely powdered condition reaches the discharge outlet or spout 27, from which it passes to any suitable receptacle. Each of the compartments 7 is preferably provided with a small door 28 for the inspection of the compartment, removal of samples, or admission of air.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim as my invention is:

1. A machine for hydrating lime comprising a cylindrical casing having a discharge stack at its upper end, a plurality of horizontally disposed partitions arranged in said casing and provided with openings therein, said openings being arranged alternately at the center and periphery of said partitions, radially extending arms revolubly mounted in said compartments and provided with depending adjustable scraping blades, the blades in one compartment being set at an angle opposite to those in the adjacent compartment, water supply spray pipes arranged in said compartments, means for controlling the supply of water to said pipes and a lime feeder having means for regulating the quantity of material fed.

2. A machine for hydrating lime comprising a cylindrical casing, a plurality of vertically spaced horizontally disposed partitions arranged in said casing, the alternate partitions being provided with openings at the centers and peripheries respectively, revoluble means for agitating the lime in said compartments and operable to move it toward said openings, means for supplying water to each of said compartments a feeder arranged adjacent said casing and provided with a reciprocating block, and means for varying the stroke of said block to regulate the amount of lime fed said casing.

JAMES CURRIE.

Witnesses:
HENRY W. MOHR,
WILLIAM McLAREN.